(12) United States Patent
Chou

(10) Patent No.: US 7,650,989 B2
(45) Date of Patent: Jan. 26, 2010

(54) LEAF-FOLDING ARTICLE PLACING STRUCTURE

(76) Inventor: Ta-Pan Chou, P. O. Box No. 6-57, Junghe, Taipei 235 (TW)

(*) Notice: Subject to any disclaimer, the term of this patent is extended or adjusted under 35 U.S.C. 154(b) by 59 days.

(21) Appl. No.: 12/076,810

(22) Filed: Mar. 24, 2008

(65) Prior Publication Data

US 2008/0173557 A1    Jul. 24, 2008

Related U.S. Application Data

(63) Continuation of application No. 12/000,552, filed on Dec. 13, 2007, now abandoned.

(30) Foreign Application Priority Data

Jan. 24, 2007    (TW) ............................... 96201395 U

(51) Int. Cl.
*B65D 85/57* (2006.01)
(52) U.S. Cl. .................................. 206/308.1
(58) Field of Classification Search ............... 206/307, 206/307.1, 308.1, 312, 387.13
See application file for complete search history.

(56) References Cited

U.S. PATENT DOCUMENTS

| 4,892,189 | A | * | 1/1990 | Kunimune et al. | 206/308.1 |
| 5,318,222 | A | * | 6/1994 | Bartlett | 206/308.3 |
| 5,775,490 | A | * | 7/1998 | Baker et al. | 206/308.1 |
| 6,443,301 | B2 | * | 9/2002 | Garnier | 206/312 |
| 6,899,223 | B2 | * | 5/2005 | Carney et al. | 206/308.1 |
| 2003/0106815 | A1 | * | 6/2003 | Myszka | 206/308.1 |

* cited by examiner

*Primary Examiner*—J. Gregory Pickett
(74) *Attorney, Agent, or Firm*—Rabin & Berdo, P.C.

(57) ABSTRACT

A loose-leaf article placing structure is composed primarily of an unfoldable board, on which is crossly divided into four leaves. Each leaf is provided with an article emplacement seat, three linked loose-leaves are located among the four leaves, the first leaf is separated from the last leaf, and the loose-leaves are deployed as that one leaf is folded inward with the other one being folded outward, alternately. Accordingly, when the board is folded, the four leaves will be overlapped, such that every two article emplacement seats are facing toward each other to facilitate placing the articles as a kit, so as to save packaging cost and increase product texture, while at a same time, with a surface of the board also directly providing for posting a printed show page.

1 Claim, 8 Drawing Sheets

LEAF-FOLDING ARTICLE PLACING STRUCTURE

This application is a Continuation of currently pending application U.S. Ser. No. 12/000,552, entitled "LEAF-FOLDING ARTICLE PLACING STRUCTURE" and filed on Dec. 13, 2007.

BACKGROUND OF THE INVENTION a) Field of the Invention

The present invention relates to an article placing structure, and more particularly to a leaf-folding article placing structure which is provided with less units, is easy to manufacture, can be applied to emplace a CD (compact disc), an ornament, cosmetics, a bridal veil, a Christmas decoration, and stationery, etc., can improve entire texture of appearance, and can be very easily packaged as a kit.

b) Description of the Prior Art

A conventional container for placing a CD is made by hard plastic, which is primarily a box formed by a set of transparent boards that are lifted against each other, with an interior of the box being disposed with a piece of plywood. An interior of the plywood is concaved with a CD emplacement seat, a periphery of the emplacement seat is provided with a finger dent for easy access, and a center is provided with an elastic locking button. The locking button is a short cylinder that adapts to a central hole of the CD, a bottom of the locking button is a shallow platform, and a top end expands roughly in an arc shape, thereby locking the CD to prevent it from dropping out upon placing the CD. In addition, the expanded head part is provided with daisy-like cut slits, allowing the head part to be shrunk inward a little upon being suppressed, such that the CD that is locked on the cylinder can be released and removed successfully.

The single-CD container has more units, and as its appearance is made by plastic, its shape will not be changed for many years. Therefore, texture for consuming has been reduced significantly. On the other hand, in order to clip in each box a show page or lyrics in application, a side of a box cover is configured as an L-shape, and a box body is changed to a concaved shape; hence, it will be very trouble in assembling, as the container should be installed piece by piece.

More particularly, if the CD is to be sold as a kit, in addition to that an inner page should be added in the box one by one, the appearance of the whole kit after installation should also be added with a printed sleeve, and an exterior should be further added with a show page to describe contents of the package. Therefore, it will take trouble and incur high cost in packaging, and the texture cannot be increased, either.

On the other hand, the CD emplacement box can have only one purpose, and cannot be used for other purposes other than for placing the CD, which is another shortcoming.

SUMMARY OF THE INVENTION

Accordingly, the primary object of the present invention is to design a leaf-folding article placing structure which is provided with less units, is easy to manufacture, can be applied to emplace a CD, an ornament, cosmetics, a bridal veil, a Christmas decoration, and stationery, etc., can improve entire texture of appearance, and can be packaged as a kit very easily.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
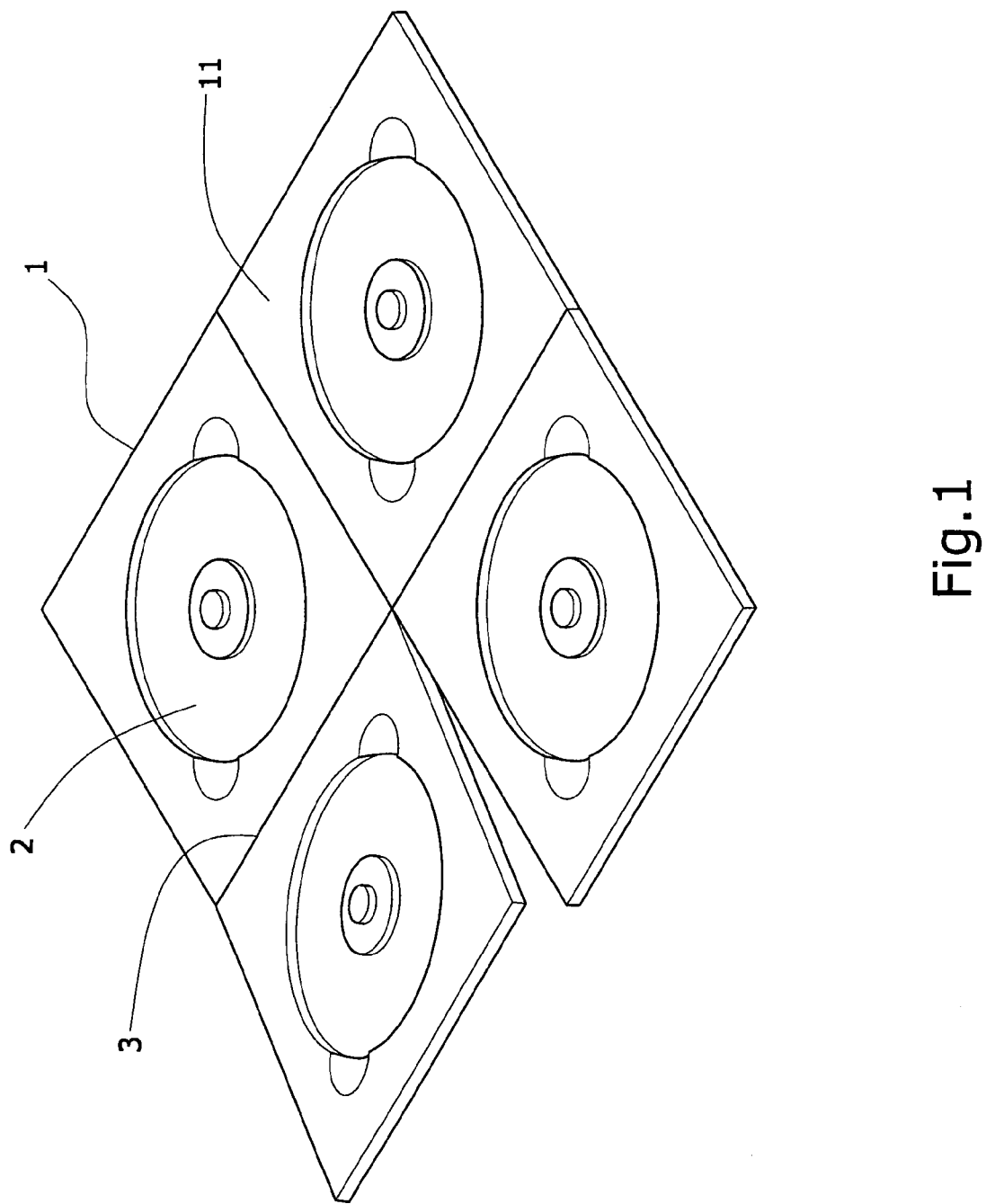
FIG. 1 shows a perspective view of the present invention, wherein a board is unfolded.
Figure 2:
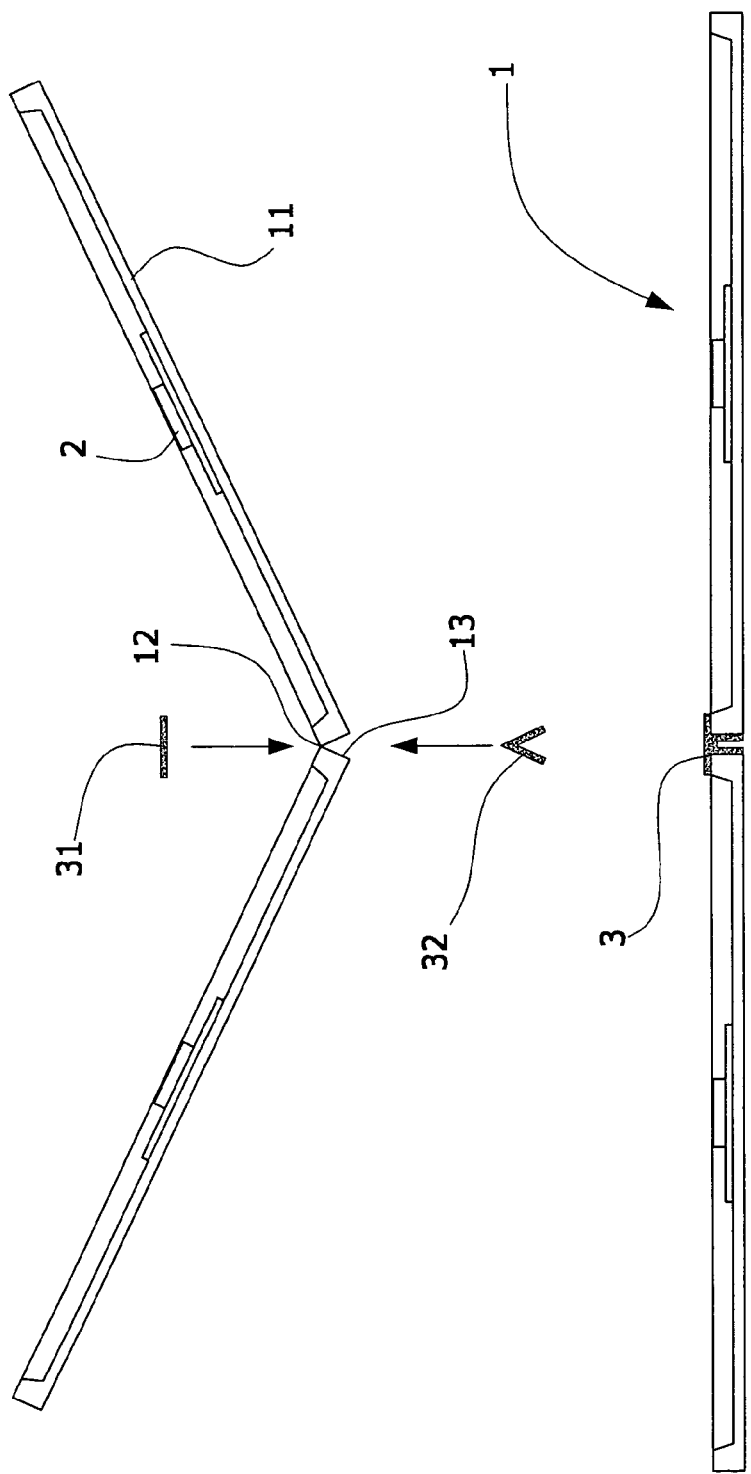
FIG. 2 shows a schematic view of the present invention, wherein a loose-leaf is connected between the leaves.
Figure 3:
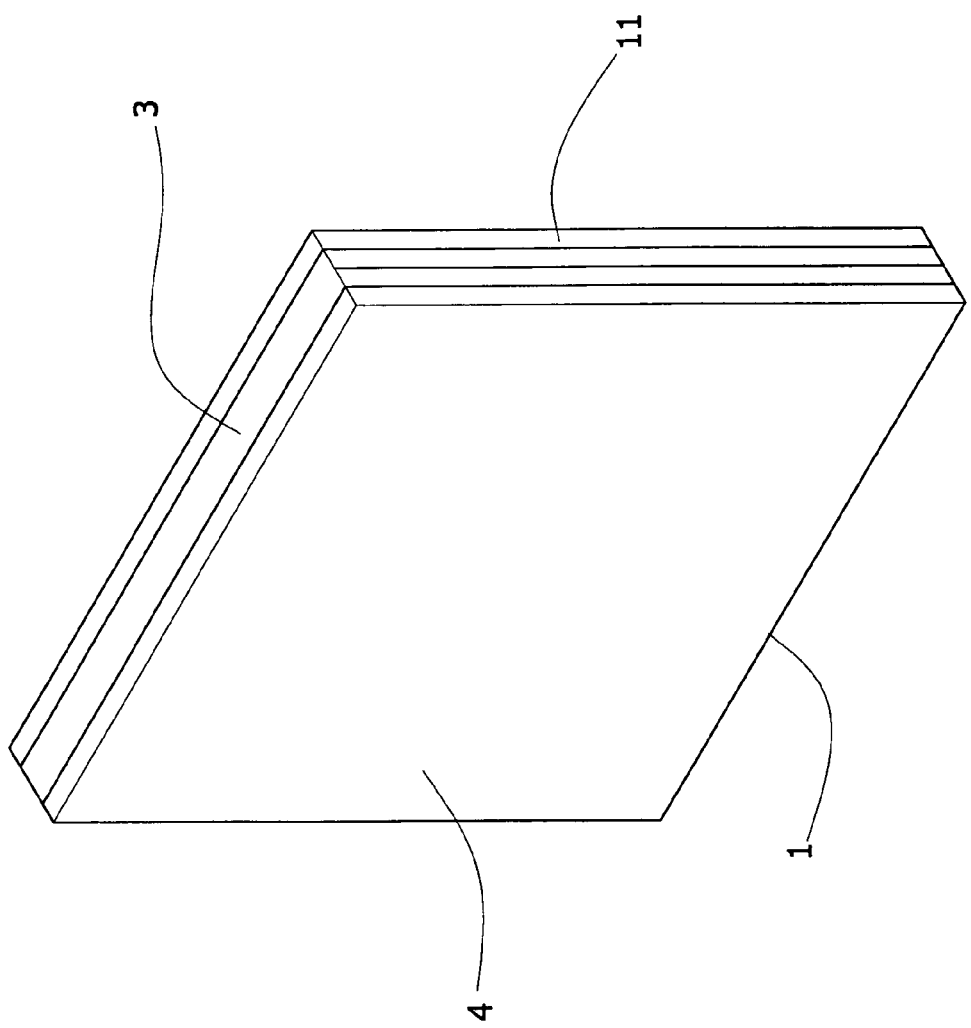
FIG. 3 shows a perspective view of the present invention, wherein leaves are folded.
Figure 4:
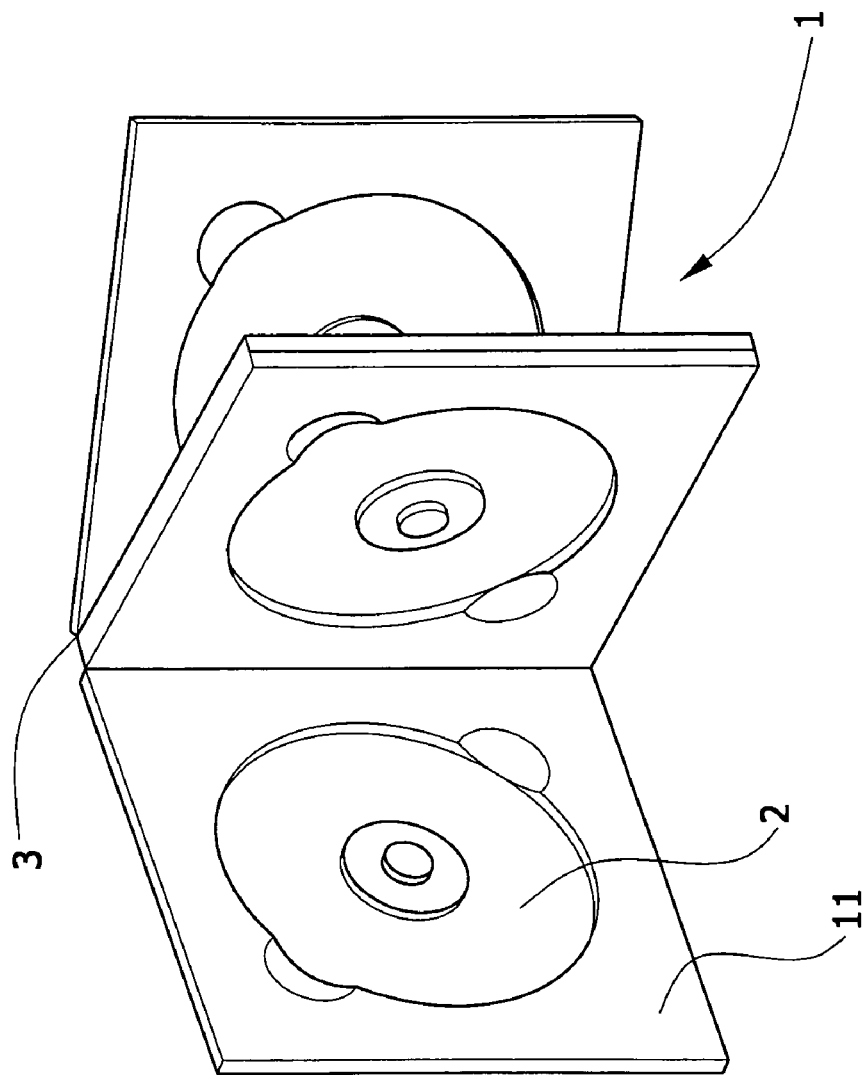
FIG. 4 shows a perspective view of the present invention, wherein leaves are unfolded.

Accordingly, a leaf-folding article placing structure of the present invention includes primarily an unfoldable board, on which is crossly divided into four leaves. Each leaf is provided with an article placing seat, three linked loose-leaves are located among the four leaves, and the first leaf is separated from the last leaf, with the loose-leaves being deployed as that one leaf is folded inward with the other one being folded outward, alternately. Accordingly, when the board is folded, the four leaves will be overlapped, and every two article placing seats will be facing toward each other, so as to facilitate emplacing articles as a kit, save packaging cost and improve product texture. In a mean time, a surface of the board can also directly provide for posting a printed show page.

Referring to FIGS. 1 to 5, the present invention is a leaf-folding article placing structure. To facilitate describing, a CD package is disclosed first. As shown in the drawings, a CD package includes primarily an unfoldable board 1, on which is crossly divided into four leaves 11, with each leaf 11 being provided with a CD emplacement seat 2, three linked loose-leaves 3 being located among the four leaves 11, the first leaf 11 being separated from the last leaf 11, and the loose-leaves 3 being alternately deployed as that one leaf is folded inward with the other one being folded outward, alternately.

Each loose-leaf 3 is constituted by an inner folding piece 31 which is attached flat on a surface seam 12 between two neighboring leaves 11, and an outer folding piece 32 which is in an A-shape, is folded and attached on sides 13 of two neighboring leaves 11.

Accordingly, by installing the CD emplacement seat 2 on each leaf 11 of the board 1, the CD can be placed as a kit to facilitate packaging. In addition, when the board 1 is folded, the four leaves 11 will be overlapped, resulting in size just like an ordinary CD kit to be sold. However, every two interior CD emplacement seats 2 will be facing toward each other to facilitate lifting and accessing, as the loose-leaves 3 are deployed as that one leaf is folded inward with the other one being folded outward, alternately. In a mean time, upon assembling, a surface of the board 1 can be also used directly for posting a printed show page 4. Therefore, packaging cost can be saved as a whole, and trouble of a prior art with multiple installations and clipping an inner page one by one, can be reduced.

Furthermore, in implementation, the board 1 can be made by a variety of paper board according to a customer's requirement, and is then attached inside with the plastic CD emplacement seats 2. Therefore, a conventional stiffly profile made by plastic can be released, to effectively improve texture of appearance of the entire CD emplacement structure. In addition, as the structural design is simple and convenient, the present invention can be manufactured in production just by molding, and cost of molding tools will be much cheaper than plastic products.

Figure 5:
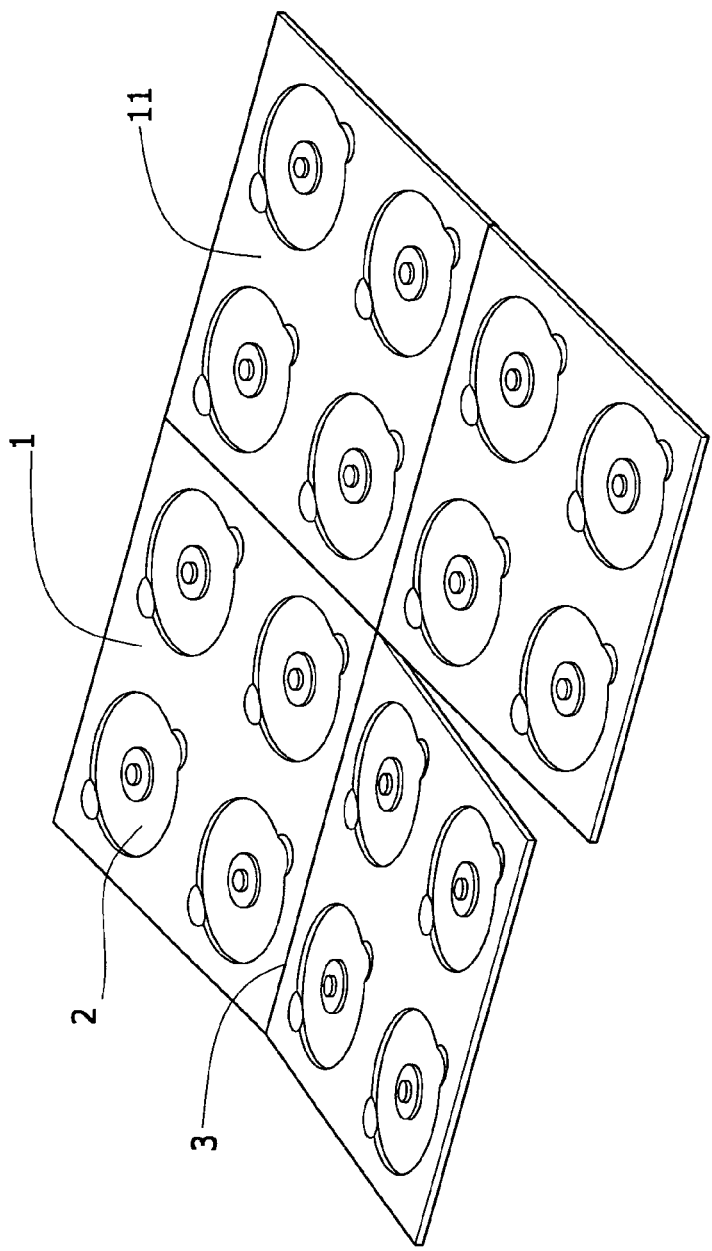
FIG. 5 shows a perspective view of another embodiment of the present invention that is unfolded.

Moreover, as shown in FIG. 1 and FIG. 5, in implementation, size of the board 1 and planning of the CD emplacement seats 2 can be also varied at any time according to different requirements; for example, each leaf 11 is provided with one or four CD emplacement seats 2, or even with three to five seats (not shown in the drawings), which will be more flexible in packaging than the prior art.

Figure 6:
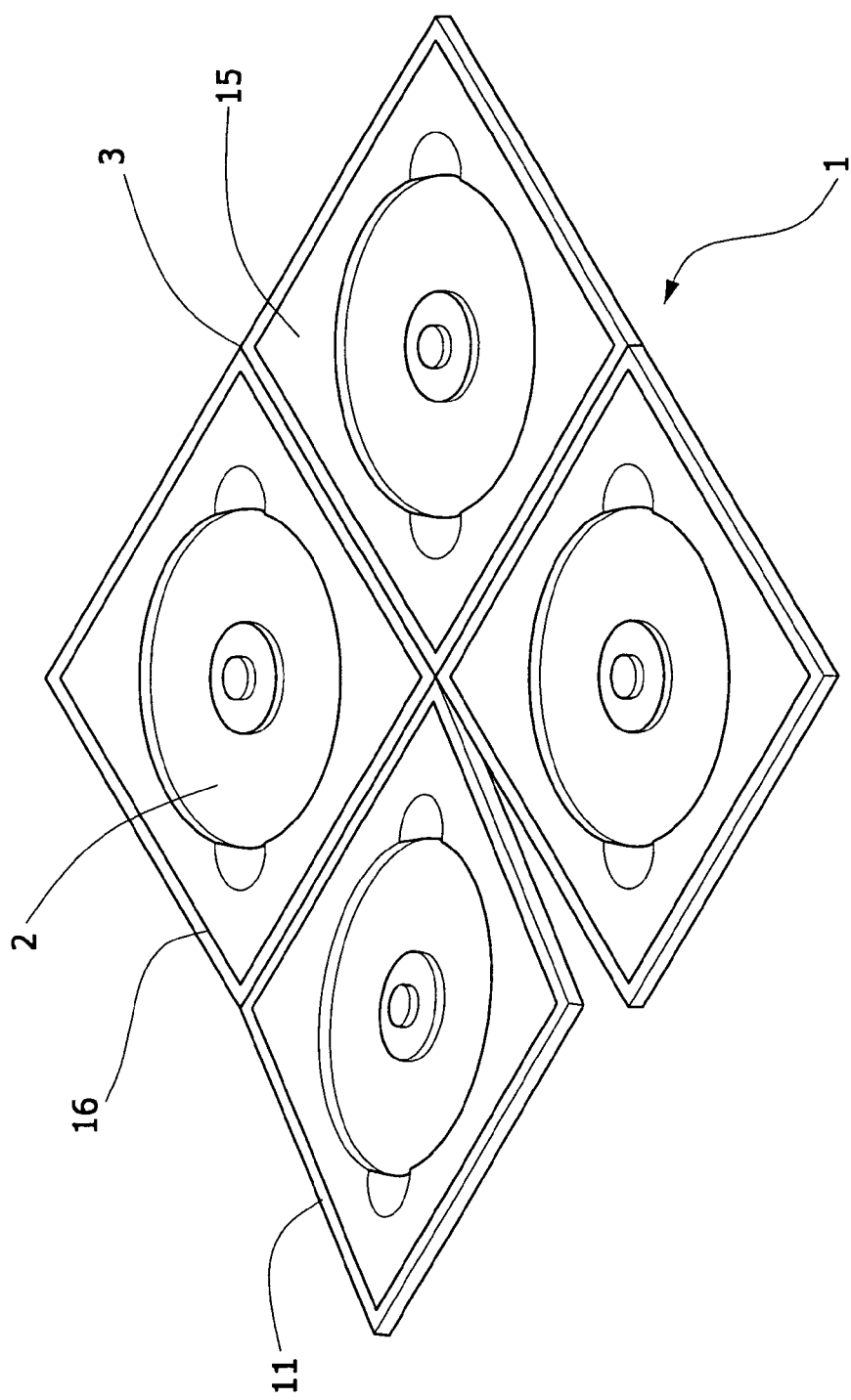
FIG. 6 shows a perspective view of a board of another embodiment of the present invention that is unfolded.
Figure 7:
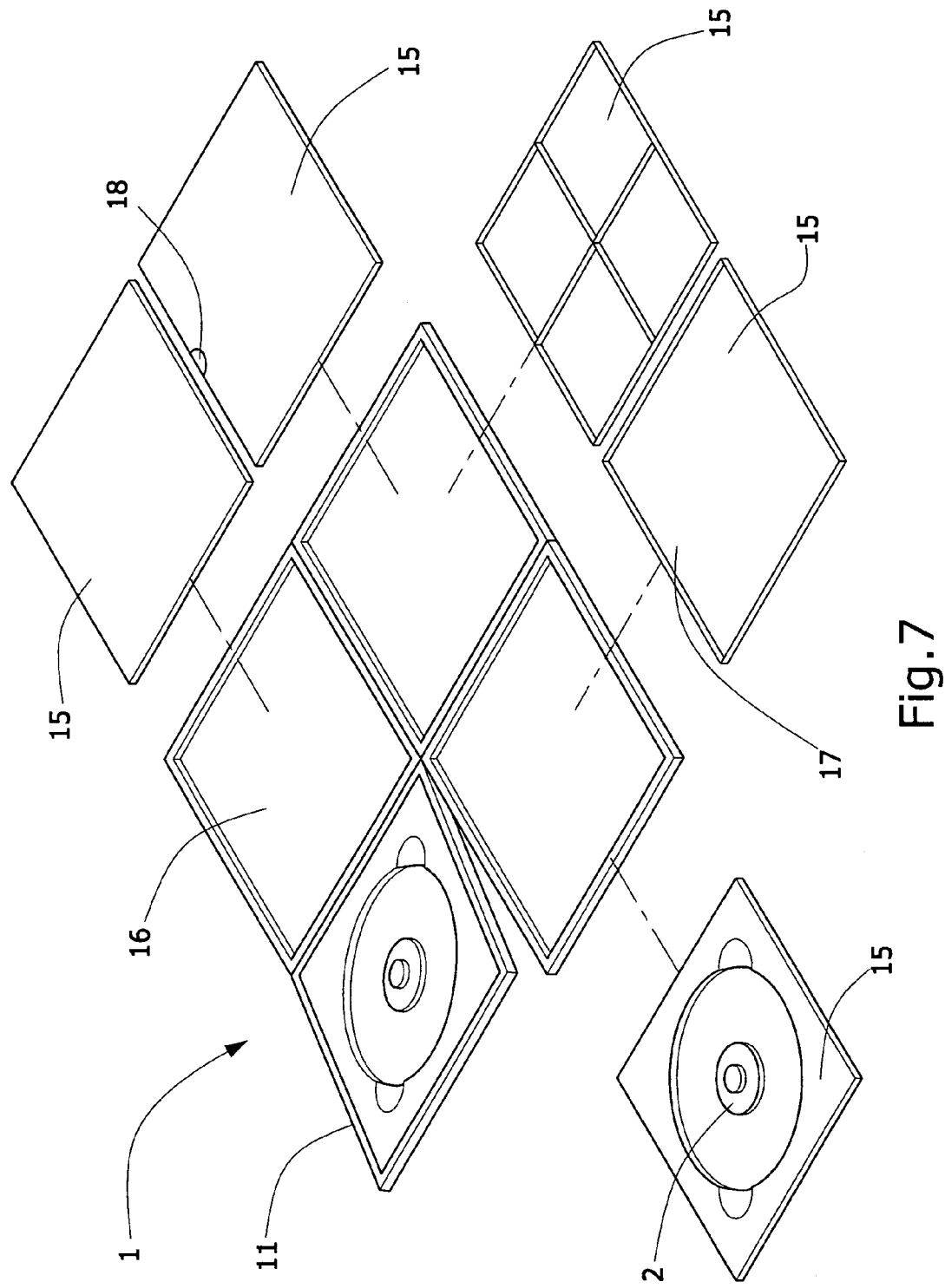
FIG. 7 shows an exploded view of another embodiment of the present invention.
Figure 8:
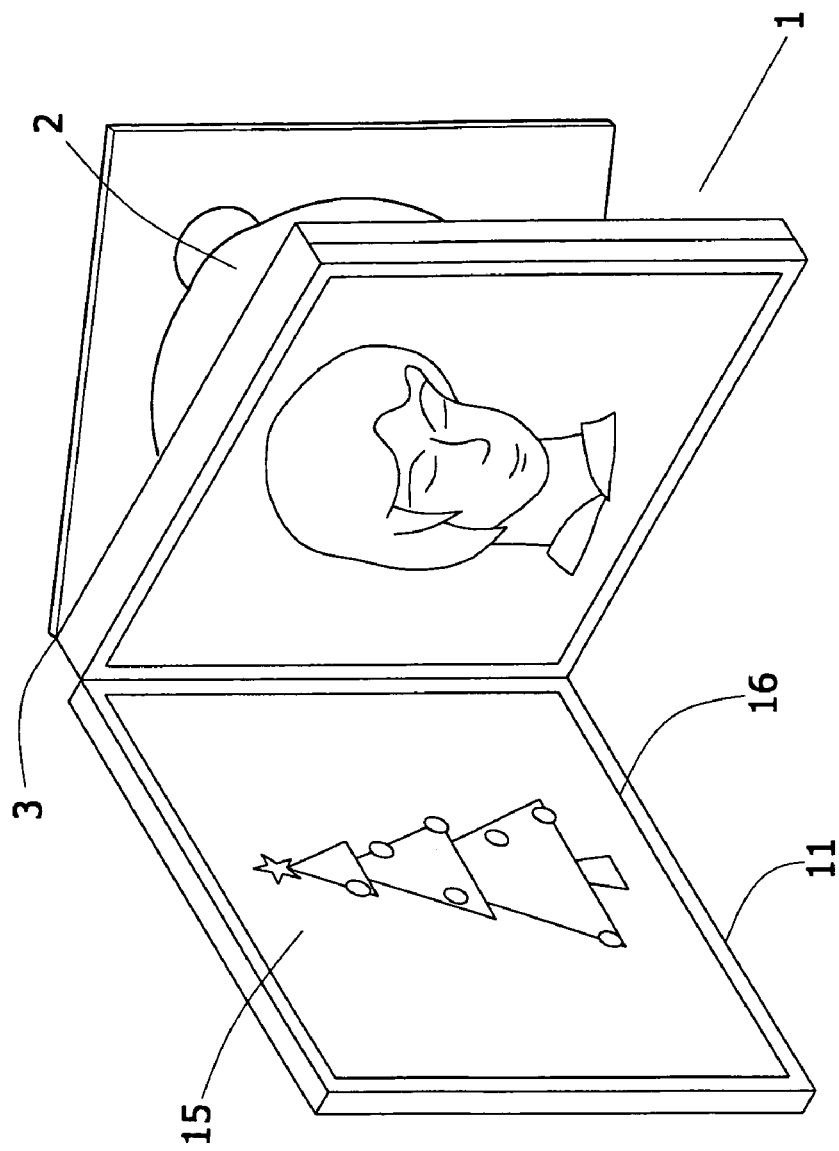
FIG. 8 shows a perspective view of leaves of another embodiment of the present invention that are unfolded.

On the other hand, referring to FIGS. 6 to 8, in order to have more extensive applications, in implementation, each leaf 11 can be also configured with a concaved space 16 in advance, such that an interior of the concaved space 16 can be filled with an inner page 15 of different shape and planning. In addition to that the inner page 15 can be made into the aforementioned CD emplacement seat 2, it can be also made into a solid transparent board, a plastic sleeve, a multiple-grid piece, a single-grid piece, etc., or even can be added with a hook 17 to hang an ornament, or be configured with a notch 18 that is easily lifted off for easily placing a graph or picture, according to a different purpose, thereby providing a more convenient application.

Thereby, after assembling the structure, the present invention can be used to place the CD, and can be even applied individually or in combination to emplace an ornament, cosmetics, a bridal veil, a Christmas decoration, and stationery, etc., allowing the application to be more versatile. For example, as shown in FIG. 8, a related CD, a photograph of a movie star, and a not-for-sale Christmas decoration (or other ornament) can be packaged as a kit, allowing contents of entire product to be more enriched, thereby increasing a value of collection.

Accordingly, the present invention can really solve the shortcomings in manufacturing and applying the conventional single-CD container, and the product can also breed into the extensive applications to emplace and collect all kinds of small articles, thereby being provided with the functions that are much better than those of the prior art.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A leaf-folding article placing structure comprising a unfoldable board, one which is crossly divided into four leaves, with each leaf being provided with a concaved space for filling with an inner page to constitute an article emplacement seat, wherein the inner page is formed by a CD (compact disc) emplacement seat, a solid transparent board, a plastic sleeve, a multi-grid piece, or a single-grid piece; three linked loose-leaves being located among the four leaves, the first leaf being separated from the last leaf, and the loose-leaves being deployed as that one leaf is folded inward with the other one being folded outward, alternately; accordingly, the four leaves being overlapped when the board is folded, such that every two article emplacement seats are facing toward each other to facilitate placing articles as a kit, so as to save packaging cost and increase product texture, while at a same time, with a surface of the board providing directly for posting a printed show page, wherein the loose-leaf is constituted by an inner folding piece which is attached flat on a surface seam between two neighboring leaves, and an outer folding piece which is in an A-shape, is folded and attached on sides of two neighboring leaves.

* * * * *